Sept. 16, 1941.                S. MEDIGOVICH                2,256,123
                                GAME HANGER
                           Filed May 2, 1938            2 Sheets-Sheet 2
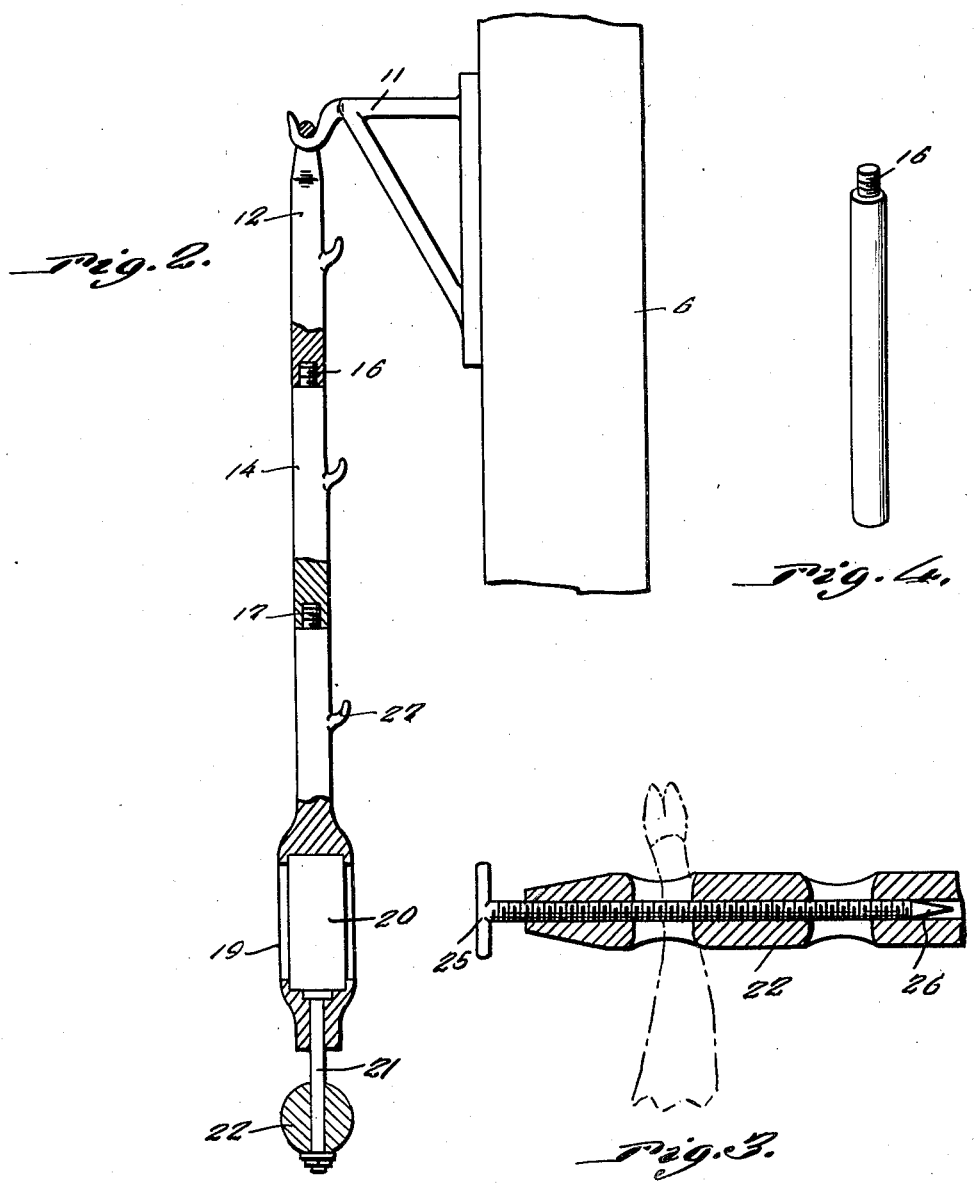
Inventor
Steve Medigovich
By Clarence A. O'Brien
   Hyman Berman
                    Attorneys Patented Sept. 16, 1941

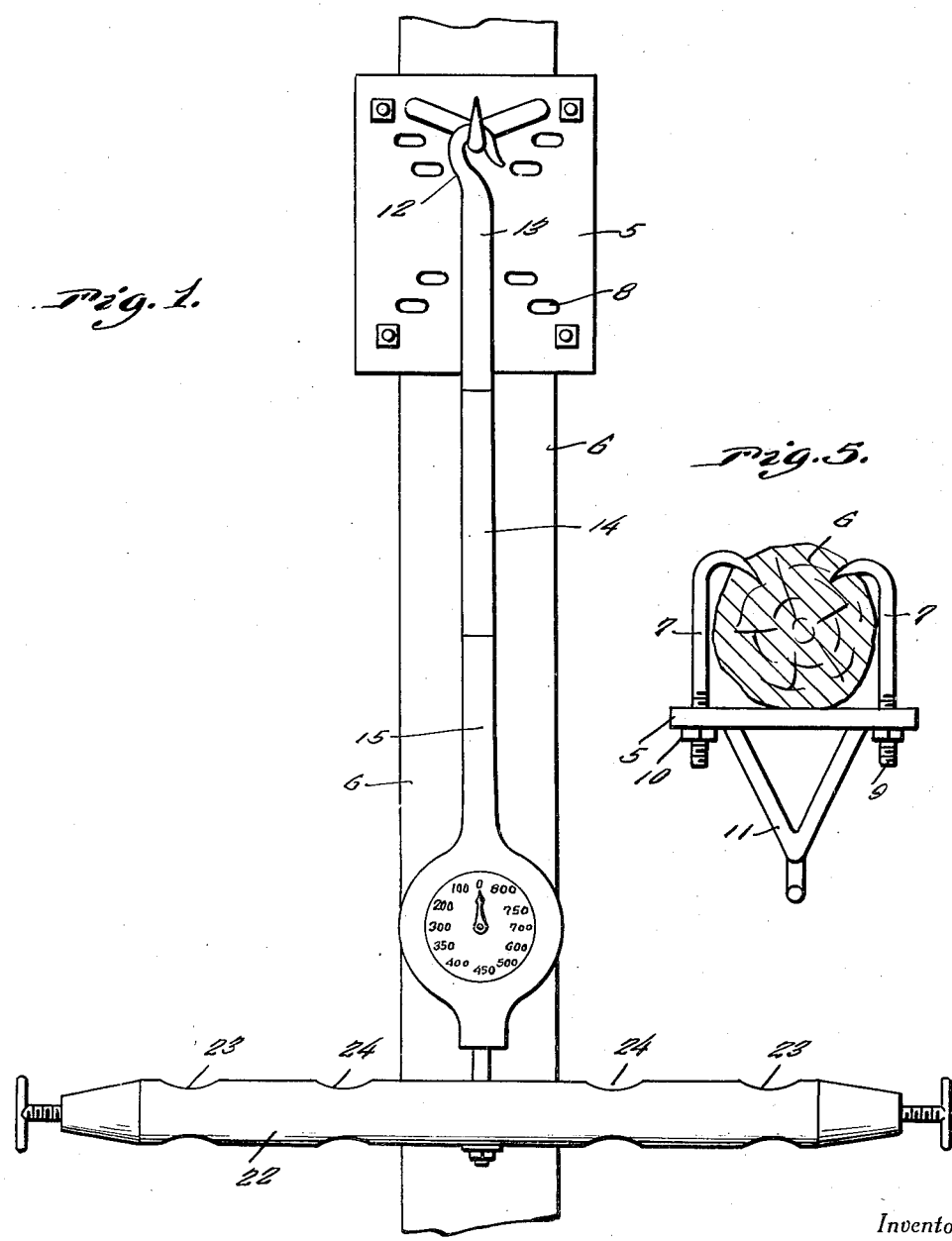

2,256,123

UNITED STATES PATENT OFFICE 2,256,123

GAME HANGER

Steve Medigovich, Bisbee, Ariz.

Application May 2, 1938, Serial No. 205,659

1 Claim. (Cl. 17—44)

This invention is a device for use in suspending game or carcasses and for weighing the latter.

An object of the invention is to provide a device of this character especially adapted for use by game hunters for suspending the carcass from a tree or other suitable support.

Further, in accordance with the present invention, the device embodies as a part thereof a scale whereby the weight of the carcass may be readily ascertained.

The invention together with its objects and advantages will be best understood from a study of the following description taken in connection with the accompanying drawings wherein:

Figure 1 is an elevational view of the device,

Figure 2 is a longitudinal sectional view therethrough,

Figure 3 is a fragmentary detail sectional view through a cross arm forming part of the invention and showing the manner of securing a leg of the carcass thereto, Figure 4 is a perspective view of one of the sections of the shank of a suspension hook, and Figure 5 is a top plan view showing the manner of securing a mounting plate to the trunk of a tree.

Referring to the drawings by reference numerals it will be seen that in accordance with the present invention I provide a substantially rectangular plate 5 of any suitable material that is adapted to be secured to the trunk 6 of a tree at the desired height through the medium of, in the present instance, four anchoring hooks 7.

To accommodate the hooks 7 the plate 5 is provided above and below the transverse center thereof with two series of slots 8, the slots of each series being laterally offset as shown so that a pair of hooks may be engaged with the plate adjacent the upper and lower ends thereof and spaced a distance apart as required by the diameter of the tree trunk 6.

The hooks 7 have the shanks thereof provided with threaded portions 9 adapted to be passed through selected slots 8 and to receive nuts 10 that are threaded home against the plate 5 in a manner to cause the pointed bills of the hooks to penetrate the tree trunk, as shown in Figure 5, thereby positively anchoring the plate to the trunk.

The plate 5 has extending forwardly therefrom and associated in any suitable manner therewith a supporting hook 11.

Further, in accordance with the present invention there is provided a suspension hook 12 having a shank composed of three sections 13, 14, 15, hook 12 being formed integral with one end of the shank section 13.

The intermediate shank section 14 is provided at one end thereof with a threaded pin 16 adapted to thread into a socket in the free end of shank 13, while shank 15 is provided at one end thereof with a threaded pin 17 adapted to thread into a socket in the lower end of the intermediate shank 14, all of which is clearly shown in Figure 2.

Shank 15 has formed integral therewith an enlarged eye 19, in which is suitably fitted a weighing scale 20 of any suitable structure.

Scale 20 has extending therefrom a suspension rod 21 on which is mounted a cross arm 22.

Cross arm 22, as clearly shown in Figure 3, is provided at opposite sides of its transverse center with pairs of openings 23, 24.

The openings 23, 24 are adapted to receive, as shown in Figure 3, the hind legs of the carcass, obviously any two openings being used, depending upon the size of the carcass.

For each pair of openings there is threaded through an end of the arm 22 an impaling screw 25 that has a pointed end 26 to facilitate the piercing of the legs of the carcass.

Also, the sections 13, 14 and 15 of the shank of suspension hook 12 are provided with hook-like projections 27 which may be used in conjunction with a block and tackle for raising the carcass to a position so that the hind legs thereof may be placed in selected openings 23, 24, after which the screws 25 are threaded inwardly to pierce and pass through the legs of the carcass, as shown in Figure 3, to positively suspend the carcass from the cross arm 22.

Obviously by reading the graduations on the scale 20 against the index of the scale the weight of the carcass suspended from the arm 22 may be readily ascertained.

It will be seen that I have provided a device for hanging a carcass from a tree trunk or the like which is comparatively simple in construction, can be readily assembled, and quickly and easily mounted on a tree trunk. Thus, it will be appreciated, a device of this character will be found useful by game hunters, as it can be easily carried as a part of their equipment.

It is thought that a clear understanding of the construction, utility and advantages of an invention of this character will be had without a more detailed description.

Having thus described the invention what is claimed as new is:

A hanger for suspending the carcasses of animals comprising an elongated bar having a hooked upper end and a cross bar at its lower end provided with a plurality of diametrical apertures therein for receiving the legs of the animals, said cross bar having a through axial bore therein, and a pair of impaling hand screws extending into said bore from opposite ends of said cross bar for turning through said apertures and through the legs of the animal to secure the same to said cross bar.

STEVE MEDIGOVICH.